United States Patent
Wang et al.

(10) Patent No.: US 10,935,272 B2
(45) Date of Patent: Mar. 2, 2021

(54) CONTROL VALVE

(71) Applicant: Siemens Schweiz AG, Zürich (CH)

(72) Inventors: Lei Wang, Beijing (CN); Zuo Hui Ren, Beijing (CN); Jian Hui Wang, Beijing (CN); Fu Lai Zhong, Tianjin (CN); Fang Zhao, Beijing (CN); Ping Zhang, Beijing (CN); Xiao Xiang Zhang, Beijing (CN); Ning Zhan, Beijing (CN)

(73) Assignee: SIEMENS SCHWEIZ AG, Zurich (CH)

( * ) Notice: Subject to any disclaimer, the term of this patent is extended or adjusted under 35 U.S.C. 154(b) by 113 days.

(21) Appl. No.: 16/224,671

(22) Filed: Dec. 18, 2018

(65) Prior Publication Data

US 2019/0186775 A1 Jun. 20, 2019

(30) Foreign Application Priority Data

Dec. 20, 2017 (CN) .......................... 2017 1 1384555

(51) Int. Cl.
*F25B 41/04* (2006.01)
*F24F 11/74* (2018.01)
(Continued)

(52) U.S. Cl.
CPC .............. *F24F 11/74* (2018.01); *F25B 41/04* (2013.01); *G05D 7/0106* (2013.01);
(Continued)

(58) Field of Classification Search
CPC ........ F24F 11/74; F24F 11/30; F24F 2110/40; F25B 41/04; F16K 3/32; G05D 7/0617; G05D 7/0106
See application file for complete search history.

(56) References Cited

U.S. PATENT DOCUMENTS

2008/0149874 A1 6/2008 Fukano et al. ................ 251/264
2008/0245428 A1 10/2008 Jorgensen .................. 137/627.5
(Continued)

FOREIGN PATENT DOCUMENTS

| CN | 101225882 A | 7/2008 | .............. F16K 1/00 |
| CN | 103216650 A | 7/2013 | ............. F16K 17/30 |

(Continued)

OTHER PUBLICATIONS

Extended European Search Report, Application No. 18206134.1, 8 pages, dated May 6, 19.

(Continued)

*Primary Examiner* — Mohammad Ali
*Assistant Examiner* — Vincent W Chang
(74) *Attorney, Agent, or Firm* — Slayden Grubert Beard PLLC

(57) ABSTRACT

Various embodiments include a control valve comprising a first valve assembly between an inlet and an outlet. The first valve assembly comprises: a valve seat fixed relative to the valve body with an opening in a sidewall; a slider rotating inside the valve seat to block the opening, but stationary in an axial direction; a regulating valve plug with an opening at one end, surrounding the valve seat and movable in the axial direction to block the opening in the sidewall of the valve seat; and a first valve stem connected to the slider and to the regulating valve plug, the first valve stem having one end extending out of the valve body. A first overlap between the slider and the opening and a second overlap of the plug and the opening are changed by movement of the first valve stem.

16 Claims, 7 Drawing Sheets

(51) Int. Cl.
*G05D 7/06* (2006.01)
*G05D 7/01* (2006.01)
*F24F 110/40* (2018.01)
*F24F 11/30* (2018.01)

(52) U.S. Cl.
CPC ............ *G05D 7/0617* (2013.01); *F24F 11/30* (2018.01); *F24F 2110/40* (2018.01)

(56) References Cited

U.S. PATENT DOCUMENTS

| | | | |
|---|---|---|---|
| 2009/0218536 A1 | 9/2009 | Wears et al. ................. | 251/319 |
| 2011/0068284 A1 | 3/2011 | Jorgensen ..................... | 251/46 |
| 2016/0139605 A1 | 5/2016 | Guidetti et al. .............. | 137/487 |
| 2016/0246306 A1* | 8/2016 | Giubertoni ........... | G05D 7/0106 |
| 2017/0198925 A1* | 7/2017 | Loeffler ............... | G05D 7/0106 |

FOREIGN PATENT DOCUMENTS

| | | | |
|---|---|---|---|
| CN | 204062069 U | 12/2014 | |
| CN | 105003686 A | 10/2015 | ............. F16K 47/02 |
| CN | 106989193 A | 7/2017 | ............... F16K 1/32 |
| WO | 2006/136158 A1 | 12/2006 | ............... F16K 3/32 |
| WO | 2009/135490 A2 | 11/2009 | ............. G05D 16/06 |
| WO | 2014/199302 A2 | 12/2014 | ............... G05D 7/06 |

OTHER PUBLICATIONS

Zhou et al., "Flow Capacity Simulation Analysis and Experiment Study of Low—Noise Flow Control Valve," China Shipbuilding Industry Corporation Number 725 Research Institute, Luoyang, China, pp. 16-18, 28 (Chinese language w/ English Abstract), Jan. 21, 2016.

* cited by examiner

CONTROL VALVE

CROSS-REFERENCE TO RELATED APPLICATIONS

This application claims priority to CN Application No. 201711384555.0 filed Dec. 20, 2017, the contents of which are hereby incorporated by reference in their entirety.

TECHNICAL FIELD

The present disclosure relates to HVAC systems. Various embodiments may include a control valve for use in a heating, ventilation and air conditioning system, e.g., a flow regulating valve (RV) and a pressure independent control valve (PICV).

BACKGROUND

The flow rate of a conventional electric regulating valve is affected by fluctuation in system pressure. As a result, electric regulating valves are instable in the delivery of heat (cold) and exhibit poor resistance to interference and low precision of regulation. A dynamic balancing electric regulating valve uses a dynamic balancing function integrated with an electric regulating function. A mechanical dynamic balancing electric regulating valve enables the regulating valve to automatically balance the effect of system pressure on flow rate during actual operation of the system, so that an output flow rate characteristic curve and an ideal flow rate characteristic curve are identical and constant, hopefully independent of pressure.

Some existing PICVs employ a substantially non-balancing design and, therefore, encounter significant resistance during operation and require a high-power actuator in order to perform control. In some other existing PICVs, a flow rate presetting function is realized by means of valve stem limiting, hence the valve stem not only serves to guide, but also has a limiting action. Furthermore, there is another existing PICV in which a valve stem is also used as a pressure-leading passage, because a flow-leading gap is small.

SUMMARY

In view of the above, the teachings of the present disclosure describe a control valve for controlling a flow rate of a fluid in a fluid passage. The control valve can realize flow rate presetting in a rotational manner, with no need for a pressure-leading passage to be formed in the valve stem, hence the difficulty of machining the valve stem is reduced, and the stability of the valve stem is increased. For example, some embodiments may include a control valve for controlling a flow rate of a fluid in a fluid passage, wherein the control valve comprises: a valve body (110), having an internal cavity, the internal cavity having an inlet passage (111) and an outlet passage (112); a first valve assembly (120), disposed between the inlet passage (111) and the outlet passage (112), the first valve assembly (120) comprising: a valve seat (121), being in the shape of a cylinder having an opening at one end, and being fixed relative to the valve body (110), wherein a circumferentially extending opening (1212) is provided in a sidewall of the valve seat (121); a slider (123), disposed inside the valve seat (121) and being movable in a circumferential direction of an inner wall of the valve seat (121), in order to partially or completely block the opening (1212) in the sidewall of the valve seat in the circumferential direction, but being stationary relative to the valve seat (121) in an axial direction (Z) of the valve seat (121); a regulating valve plug (124), being in the shape of a cylinder having an opening at one end, being arranged to surround the valve seat (121) concentrically, and being movable in the axial direction (Z) of the valve seat, in order to partially or completely block the opening (1212) in the sidewall of the valve seat in the axial direction; a first valve stem (125), being connected to the slider (123) and to the regulating valve plug (124), and having one end extending out of the valve body (110); wherein an amount of overlap of the slider (123) and the opening (1212) in the circumferential direction and an amount of overlap of the regulating valve plug (124) and the opening (1212) in the axial direction are changed by means of the first valve stem (125).

In some embodiments, the first valve stem (125) passes through the regulating valve plug (124) in such a way as to be capable of relative movement, and is connected in a fixed manner to the regulating valve plug (124) in the axial direction (Z); and the first valve stem (125) passes through the valve seat (121) in such a way as to be capable of relative movement, such that another end of the first valve stem (125) is connected in a shape-fitting manner to the slider (123) in the circumferential direction.

In some embodiments, the control valve further comprises a second valve assembly (130), disposed between the inlet passage (111) and the outlet passage (112), and separated in space from the first valve assembly (120), the second valve assembly (130) being a pressure difference balancing valve, capable of regulating a flow rate according to the difference between a first fluid pressure (P1) and a second fluid pressure (P2), wherein the first fluid pressure (P1) is a pressure at the inlet passage (111), and the second fluid pressure (P2) is a fluid pressure between the first valve assembly (120) and the second valve assembly (130).

In some embodiments, the first valve assembly (120) and the second valve assembly (130) are positioned one above the other in the internal cavity, and the second valve assembly (130) is located downstream of the first valve assembly (120).

In some embodiments, the second valve assembly (130) comprises: a movable balancing valve plug (131), being in the shape of a cylinder having an opening at one end, and being capable of displacement in an axial direction (Z) thereof so as to change a flow rate of flow to the outlet passage (112), wherein one side of the balancing valve plug (131) is subjected to an applied force (F2) of the first fluid pressure (P1) at the inlet passage (111), another side is subjected to a resultant force (F1) of an applied force (f) of an elastic member (132) and an applied force of the second fluid pressure (P2), and the balancing valve plug (131) attains a balanced state under the joint action of the forces at the two sides.

In some embodiments, the second valve assembly (130) further comprises: a rolling diaphragm (133) in sealed connection with the valve body (110), one side of the rolling diaphragm (133) being subjected to the applied force of the first fluid pressure (P1), and another side abutting an outer wall of the balancing valve plug (131); the elastic member (132), disposed inside the balancing valve plug (131) and being capable of extending and retracting in the axial direction (Z) of the balancing valve plug (131), the elastic member (132) having one end fixed and another end abutting an inner wall of the balancing valve plug (131).

In some embodiments, there is a first pressure-leading tube (114), which establishes communication between the inlet passage (111) and said one side of the rolling diaphragm (133).

In some embodiments, the second valve assembly (130) further comprises: a valve cover (134), covering an opening of the balancing valve plug (131), with at least one through-hole (1341) being provided in the valve cover (134), to establish fluid communication between the inside and outside of the balancing valve plug (131).

In some embodiments, the second valve assembly (130) further comprises: a second valve stem (135), having one end fixed to the valve body (110), and another end inserted into the balancing valve plug (131), the elastic member (132) being arranged to surround the second valve stem (135), and said one end of the elastic member (132) abutting the other end of the second valve stem (135).

In some embodiments, the first valve assembly (120) further comprises: a pressure-leading groove (401), disposed between the valve seat (121) and the valve body (110) and surrounding the valve seat (121); a pressure-leading hole (1211), disposed in the valve seat (121), such that a region having the second fluid pressure (P2) inside the valve seat (121) is in fluid communication with the pressure-leading groove (401); a second pressure-leading tube (1101), disposed on the valve body (110), such that the pressure-leading groove (401) is in fluid communication with the outside of the valve body (110).

In some embodiments, there is a supporting valve seat (140), which is annular, fixed to the valve body (110), and used for supporting the valve seat (121); and the pressure-leading groove (401) being disposed in an annular space enclosed by the supporting valve seat (140), the valve seat (121) and the valve body (110).

In some embodiments, a sealing hoop (1214) is provided around an outer wall of the valve seat (121) in contact with the valve body (110), and/or a sealing hoop (1216) is provided around an outer wall of the valve seat (121) in contact with the regulating valve plug (124), and/or a sealing ring (1242) is provided at an opening end of the regulating valve plug (124).

In some embodiments, at least one through-hole (1241) is provided in an end face of the regulating valve plug (124), to establish fluid communication between the inside and outside of the regulating valve plug (124).

In some embodiments, a flow rate graduated disk (150) is provided around the first valve stem (125) at an end of the valve body (110) where the first valve stem (125) is allowed to extend out, with a longitudinally extending marker line (1257) being provided on the first valve stem (125), and when the first valve stem (125) is rotated into place, a value on the flow rate graduated disk (150) corresponding to the marker line (1257) indicates a currently preset flow rate value.

In some embodiments, the opening (1212) provided in the valve seat (121) extends circumferentially through 170 degrees to 190 degrees.

BRIEF DESCRIPTION OF THE DRAWINGS

Some example embodiments of the present disclosure are described in detail below with reference to the accompanying drawings, to give those skilled in the art a clearer understanding of the abovementioned and other features and advantages of the present disclosure. In the figures.

DETAILED DESCRIPTION

Figure 1:
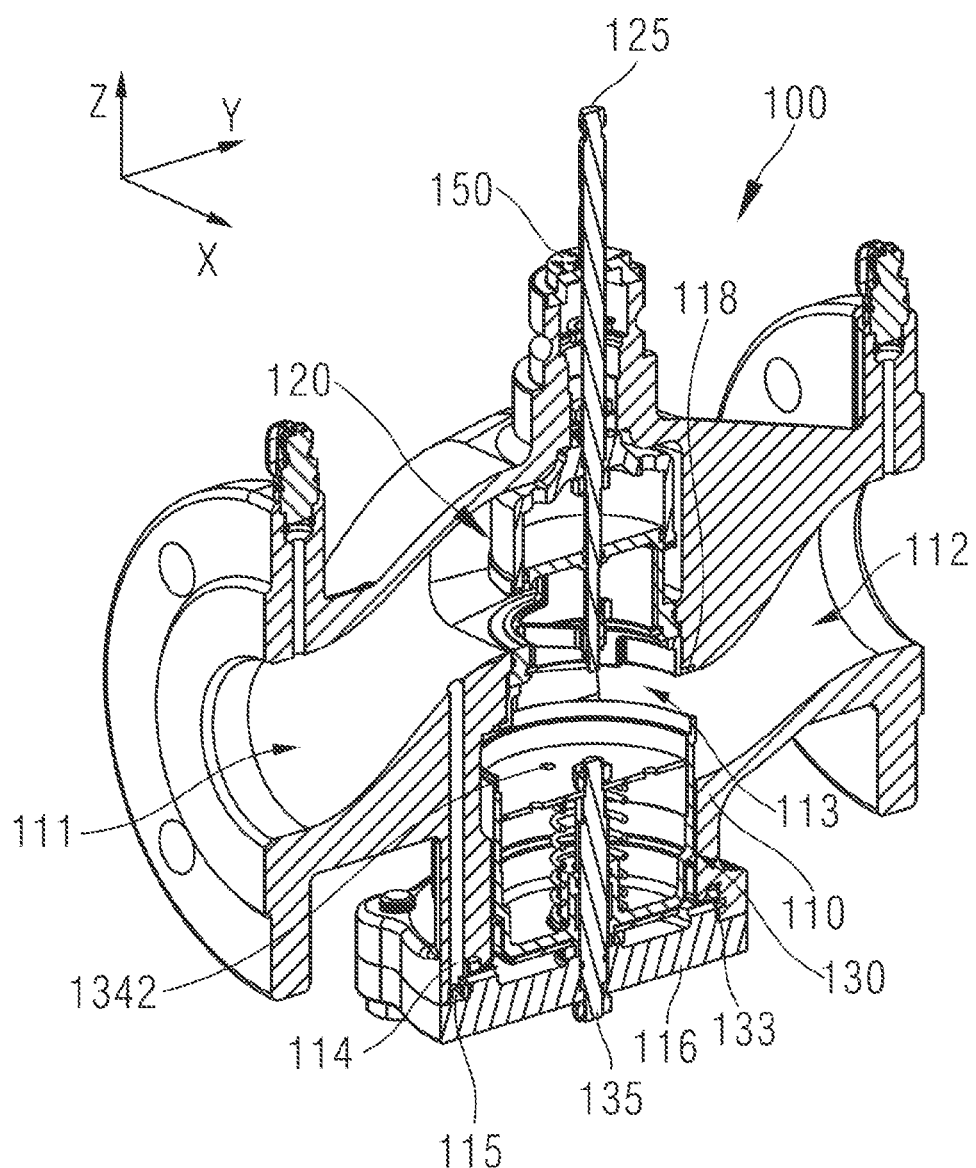
FIG. 1 is a three-dimensional view of a section in the Y direction of a control valve incorporating teachings of the present disclosure.

In some embodiments of the present disclosure, the control valve comprises: a valve body, having an internal cavity, the internal cavity having an inlet passage and an outlet passage; a first valve assembly, disposed between the inlet passage and the outlet passage, the first valve assembly comprising: a valve seat, being in the shape of a cylinder having an opening at one end, and being fixed relative to the valve body, wherein a circumferentially extending opening is provided in a sidewall of the valve seat; a slider, disposed inside the valve seat and being movable in a circumferential direction of the sidewall of the valve seat, in order to partially or completely block the opening in the sidewall of the valve seat in the circumferential direction, but being stationary relative to the valve seat in an axial direction of the valve seat; a regulating valve plug, being in the shape of a cylinder having an opening at one end, being arranged to surround the valve seat concentrically, and being movable in the axial direction of the valve seat, in order to partially or completely block the opening in the sidewall of the valve seat in the axial direction; the control valve further comprises a first valve stem, being connected to the slider and to the regulating valve plug, and having one end extending out of the valve body, wherein an amount of overlap of the slider and the opening in the circumferential direction and an amount of overlap of the regulating valve plug and the opening in the axial direction are changed by operating the first valve stem. In a preferred embodiment, the opening provided in the sidewall of the valve seat extends circumferentially through (about) 170 degrees to 190 degrees.

The control valve such embodiments comprises a mechanical dynamic balancing electric regulating valve and can automatically balance the effect of HVAC system pressure on flow rate. In some embodiments, a first valve assembly contained in the control valve has a flow rate presetting function and a flow rate regulating function. The flow rate presetting function is realized by the first valve stem driving the slider to partially or completely block the opening in the sidewall of the valve seat in the circumferential direction. Throughout the process of flow rate regulation, the slider is stationary relative to the valve seat/valve body in the axial direction. Such a flow rate presetting function may be realized by turning the first valve stem; this can not only control the flow rate more precisely, but also enables an effect on the system to be reduced by adjusting the preset flow rate when the valve stem cannot move axially due to a fault. The flow rate regulating function is realized by the first valve stem driving the regulating valve plug to partially or completely block the opening in the side of the valve seat in the axial direction and can perform flow rate regulation within a preset flow rate range.

In some embodiments, the first valve stem passes through the regulating valve plug in such a way as to be capable of movement, and is connected in a fixed manner in the axial direction thereof to the regulating valve plug, and the first valve stem passes through the valve seat in such a way as to be capable of relative movement, such that another end of the first valve stem is connected in a shape-fitting manner to the slider in the circumferential direction. Thus, the first valve stem can preset an allowed flow rate in a rotational fashion and can also regulate the flow rate through upward/downward movement of a straight stroke and, at the same time, there is no need for a pressure-leading passage to be provided in the first valve stem; thus the first valve stem is simple in design, convenient to install, and has a long service life.

In some embodiments, the control valve further comprises a second valve assembly, disposed between the inlet passage and the outlet passage. The second valve assembly is separated in space from the first valve assembly, the second valve assembly being capable of regulating a flow rate according to the difference between a first fluid pressure P1 at the inlet passage and a second fluid pressure P2 between the first and second valve assemblies. Here, the second valve assembly is a pressure difference balancing valve. In an embodiment, the first valve assembly and the second valve assembly may be positioned one above the other, and the second valve assembly is located downstream of the first valve assembly. Here, since the first valve assembly and the second valve assembly are separated in space, the two valve assemblies do not interfere with one another, have stable operating states, and are easy to install, with a relatively simple structure.

In some embodiments, the second valve assembly comprises: a movable balancing valve plug, being in the shape of a cylinder having an opening at one end, and being capable of displacement in an axial direction thereof so as to change a flow rate of flow to the outlet passage, wherein one side of the balancing valve plug is subjected to an applied force of the first fluid pressure at the inlet passage, another side is subjected to a resultant force of an applied force of an elastic member and an applied force of the second fluid pressure, and the balancing valve plug attains a balanced state under the joint action of the forces at the two sides.

In some embodiments, the second valve assembly ensures that the difference between the first and second fluid pressures is a constant value by regulating the flow rate. When the control valve is affected by a change in HVAC system pressure, the second valve assembly can respond quickly, balancing the effect of system pressure on the valve, and reducing noise and system vibration. The abovementioned mechanical structure of the second valve assembly can also ensure that the control valve still has a dynamic balancing function in a state in which electricity is cut off.

In some embodiments, the second valve assembly comprises: a rolling diaphragm in sealed connection with the valve body, one side of the rolling diaphragm being subjected to the applied force of the first fluid pressure, and another side abutting an outer wall of the balancing valve plug; the elastic member, disposed inside the balancing valve plug and being capable of extending and retracting in the axial direction of the balancing valve plug, the elastic member having one end fixed and another end abutting an inner wall of the balancing valve plug. The rolling diaphragm in this embodiment can transmit the applied force of the first fluid pressure P1 to the balancing valve plug; moreover, the rolling diaphragm is of small volume and convenient to use.

In some embodiments, the control valve further comprises a first pressure-leading tube, which is disposed on the valve body and used for establishing communication between the inlet passage and said one side of the rolling diaphragm. Compared with using a valve shaft directly as a pressure-leading passage, the provision of the first pressure-leading tube on the valve body gives a more reliable structure, which does not become blocked easily, and is easy to realize and maintain.

In some embodiments, the second valve assembly further comprises: a valve cover, covering an opening of the balancing valve plug, with at least one through-hole being provided in the valve cover, to establish fluid communication between the fluid passage and the interior of the balancing valve plug. The valve cover in this embodiment can increase the stability of water flow inside the balancing valve plug, thereby reducing turbulence inside the balancing valve plug, as well as vibration and noise caused by turbulence. In some embodiments, a small through-hole is used to establish fluid communication between the inside and outside of the balancing valve plug; the small hole can inhibit large impurities from entering the balancing valve plug.

In some embodiments, the second valve assembly further comprises: a second valve stem, having one end fixed to the valve body, and another end inserted into the balancing valve plug, the elastic member being arranged to surround the second valve stem, and said one end of the elastic member abutting the other end of the second valve stem. The second valve stem in such embodiments has a guiding action, and can cause the balancing valve plug and the elastic member to move in the axial direction in which the second valve stem lies, in order to avoid tilting, such that guiding and limiting functions are more reliable; moreover, the second valve stem has a low level of machining difficulty, and a low level of risk in use.

In some embodiments, the first valve assembly further comprises: a pressure-leading groove, disposed between the valve seat and the valve body and surrounding the valve seat; a pressure-leading hole, disposed in the valve seat, such that a region having the second fluid pressure inside the valve seat is in fluid communication with the pressure-leading groove; a second pressure-leading tube, disposed on the valve body, such that the pressure-leading groove is in fluid communication with the outside of the valve body. In an embodiment, the structure of the pressure-leading groove, the pressure-leading hole and the second pressure-leading tube can acquire the second fluid pressure inside the control valve in a simpler and more convenient way. Taking pressure at multiple points enables more precise monitoring of the control valve.

In some embodiments, the first valve assembly further comprises a supporting valve seat, which is annular, fixed to the valve body, and used for supporting the valve seat; the pressure-leading groove being disposed in an annular space enclosed by the supporting valve seat, the valve seat and the valve body. The supporting valve seat enables more stable fixing to the valve body.

In some embodiments, a sealing hoop is provided around an outer wall of the valve seat in contact with the valve body, and/or a sealing hoop is provided around an outer wall of the valve seat in contact with the regulating valve plug, and/or a sealing ring is provided at an opening end of the regulating valve plug. In this embodiment, the sealing ring or sealing hoop is used to block fluid communication between the regulating valve plug and the valve seat, or between the inlet and the regulating valve plug.

In some embodiments, at least one through-hole is provided in an end face of the regulating valve plug, to establish fluid communication between the inside and outside of the regulating valve plug. The through-hole in an embodiment of the present disclosure is used to establish fluid communication between the inside and outside of the regulating valve plug, i.e. to ensure that the pressure inside the regulating valve plug is equal to the first fluid pressure at the inlet passage, thereby reducing a driving force on the first valve stem.

In some embodiments, a flow rate graduated disk is provided around the first valve stem at an end face of the valve body where the first valve stem is allowed to extend out, with a longitudinally extending marker line being provided on the first valve stem, and when the first valve stem is rotated into place, a value on the flow rate graduated disk corresponding to the marker line indicates a currently preset flow rate value. The flow rate graduated disk may be fixed, so readings can be taken more conveniently.

In some embodiments, dynamic balancing and electric regulation are integrated. The use of a mechanical dynamic balancing electric regulating valve enables the system to automatically balance the effect of system pressure on flow rate during actual operation, so that an outputted flow rate characteristic curve and an ideal flow rate characteristic curve are identical and constant.

In order to clarify the object, technical solution, and advantages of the present disclosure, the teachings herein are explained in further detail below by way of various embodiments.

FIG. 1 is a drawing showing a three-dimensional sectional view of a control valve 100 incorporating teachings of the present disclosure. As shown in FIG. 1, in some embodiments of the present disclosure, a valve body 110 of the control valve 100 (an actuating mechanism connected to the control valve 100 is not shown) is connected in a fluid passage, and (used) for controlling a flow rate of a fluid in the fluid passage. The valve body 110 has an internal cavity, through which the fluid flows. The fluid flowing through the internal cavity of the valve body 110 may be a liquid, such as water or a water-containing mixture, and may also be a gas, such as vapor. A communication port 118 is provided in the internal cavity of the valve body 110; the communication port divides the internal cavity into an inlet passage 111 and an outlet passage 112. Here, the concepts of inlet and outlet are relative, not restrictive. Depending on actual application needs, the fluid could also enter through the outlet passage 112 and flow out through the inlet passage.

As shown in FIG. 1, a first valve assembly 120 and a second valve assembly 130 are provided in the internal cavity of the valve body 110. The first valve assembly 120 is disposed upstream of the communication port 118, can preset a flow rate through the internal cavity of the valve body 110, and can regulate the flow rate in response to actuator control within a range defined by the preset flow rate. The second valve assembly 130 is a pressure difference balancing valve, which can automatically balance a pressure difference between the inlet passage 111 and the communication port 118 within a certain range, to ensure that the flow rate is independent of pressure.

In the example shown in FIG. 1, the first valve assembly 120 and the second valve assembly 130 are separated from each other in space. Within the internal cavity, the first valve assembly 120 may be located upstream of the second valve assembly 130 or be located downstream of the second valve assembly 130. In the example shown in FIG. 1, the first valve assembly 120 and the second valve assembly 130 are positioned one above the other in a cavity body between the inlet passage and the outlet passage, and the first valve assembly 120 is located upstream of the second valve assembly 130. In other embodiments, the second valve assembly 130 could also be located upstream of the first valve assembly 120; the relative positions thereof are determined by the specific application circumstances.

Suppose that a fluid pressure at the inlet passage 111 is a first fluid pressure P1. Due to a regulating action of the first valve assembly 120, a fluid pressure at a fluid passage 113 between the first valve assembly 120 and the second valve assembly 130 is a second fluid pressure P2. There might be a pressure difference between the first fluid pressure P1 and the second fluid pressure P2. A fluid pressure at the outlet passage 112 is a third fluid pressure P3. The second valve assembly 130 can regulate a degree of opening toward the outlet passage 112 according to the difference between the first fluid pressure P1 and the second fluid pressure P2, and thereby ensure that the flow rate through the control valve 100 is independent of the pressure difference between the first fluid pressure P1 at the inlet passage and the second fluid pressure P2 at the outlet passage.

First Valve Assembly—Flow Regulating Valve

Figure 2A:
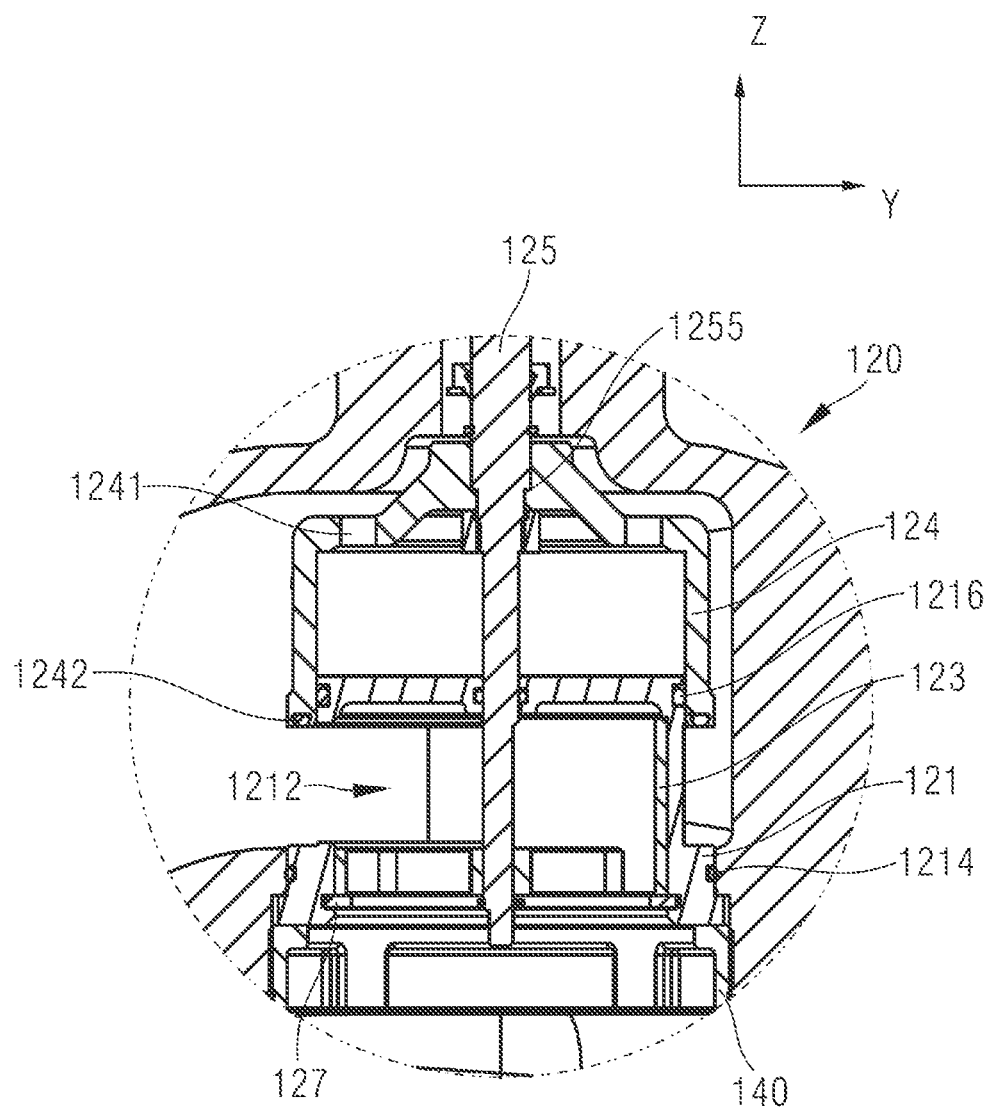
FIG. 2A is a view of a section in the Y direction of a first valve assembly 120 in the embodiment shown in FIG. 1.
Figure 2B:
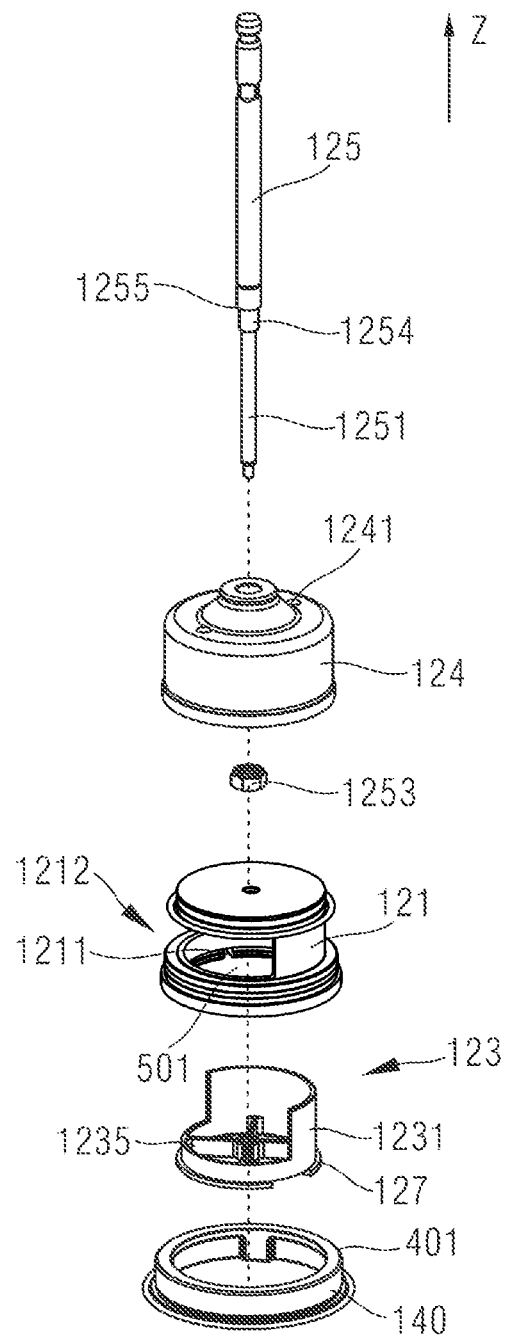
FIG. 2B is an exploded view of the first valve assembly 120 in the embodiment shown in FIG. 1.

FIGS. 2A and 2B show a sectional drawing and an exploded drawing of the first valve assembly 120 in FIG. 1 respectively. In the embodiment shown in FIGS. 2A and 2B, the first valve assembly 120 comprises a valve seat 121, a slider 123, and a regulating valve plug 124. As shown in FIG. 2A, the valve seat 121 is disposed at the communication port 118 and fixed to the valve body 110; the regulating valve plug 124 is arranged to surround the valve seat 121; the slider 123 is positioned inside the valve seat 121 and can slide in a circumferential direction of an inner wall of the valve seat 121.

As shown in FIG. 2B, the valve seat 121 is substantially in the shape of a cylinder having an opening at one end (or is similar in shape to a bell jar). In FIG. 2B, an opening 501 of the valve seat 121 is located at a lower end face of the valve seat 121, and the size of the opening 501 is substantially equal to an internal diameter of the valve seat 121. The slider 123 can be inserted into the valve seat 121 through the opening 501. A sidewall of the valve seat 121 is provided with an opening 1212 extending in the circumferential direction thereof. The opening 1212 may, by way of non-limiting example, extend through (about) 170 degrees to 190 degrees, through 175 degrees to 185 degrees, in particular through 180 degrees, in the circumferential direction of the valve seat. The size of the opening 1212 determines a maximum preset flow rate of the control valve 100. In some embodiments, the opening 1212 may be designed to extend circumferentially through other angles, according to a maximum value of preset flow rate. It can be seen from FIGS. 2A and 2B that in the absence of any blocking, fluid coming from the inlet passage 111 can flow into the valve seat 121 through the opening 1212 of the valve seat 121, and flow out through the opening 501.

As shown in FIGS. 2A and 2B, the slider 123 is sheathed inside the valve seat 121 and adapted to slide in the circumferential direction of the inner wall of the valve seat 121, so as to block a part or all of the opening 1212. The relative positions of the slider 123 and the valve seat 121 in the circumferential direction can be adjusted by means of a first valve stem 125. Specifically, as shown in FIG. 2B, the slider 123 comprises an arcuate blocking part 1231, and a connecting part 1235 extending from (or connected to) the blocking part 1231. The blocking part 1231 of the slider 123 is an arcuate blocking piece or blocking plate, with an external diameter of the arc shape being matched to an internal diameter of the valve seat 121. In the example shown in FIG. 2B, the blocking part 1231 is preferably a cylinder wall extending substantially through half a circumference (e.g. about 170-190 degrees) and can partially or completely block the opening 1212 in the valve seat 121 by sliding.

By adjusting the size of the opening 1212 that is blocked by the slider 123, a flow rate value set in advance can be adjusted, to realize a flow rate presetting function. The connecting part 1235 of the slider 123 can be arranged to surround a lower part 1251 of the first valve stem 125 and can be connected to the lower part 1251 of the first valve stem 125 in a shape-fitting manner. For example, a square hole may be provided in the center of the connecting part 1235, and the lower part 1251 of the first valve stem 125 may have a square cross section. Thus, once the lower part 1251 of the first valve stem 125 has been inserted into the square hole of the connecting part 1235, rotational movement of the first valve stem 125 can drive corresponding rotation of the slider 123. At the same time, the slider 123 does not undergo axial displacement, but is restricted within the valve seat 121, i.e. stationary relative to the valve body in the direction of the Z axis. In some embodiments, the connecting part 1235 also has multiple spokes connected to the blocking part, to realize better supporting and connecting effects.

As shown in FIGS. 2A and 2B, the regulating valve plug 124 is in the shape of a cylinder having an opening at one end (similar in shape to a bell jar), is arranged to surround the valve seat 121, and can move in the axial direction of the valve seat 121 (can move up and down in the Z direction in the figures), so as to partially or completely block the opening 1212 in the valve seat 121 in the axial direction. In some embodiments, an overlap amount of the regulating valve plug 124 and the valve seat 121 in the axial direction can be changed by operating the first valve stem 125. Specifically, as shown in FIG. 2B, a through-hole in the center of the top of the regulating valve plug 124 can be arranged to surround the first valve stem 125, and an upper end face of the regulating valve plug 124 can abut a flange 1255 on the first valve stem 125. Next, a nut 1253 is provided in a surrounding manner from the lower end of the first valve stem 125 and tightened on a threaded part 1254 of the first valve stem 125 inside the regulating valve plug 124, wherein a distance between the threaded part 1254 and the flange 125 is exactly adapted for clamping of the regulating valve plug 124. Thus, the regulating valve plug 124 is fixed relative to the first valve stem 125 in the axial direction and moves up and down together therewith but does not rotate synchronously with the first valve rod 125 in the circumferential direction.

In some embodiments, such as the embodiment of FIG. 2B, at least one through-hole 1241 may be provided in the upper end face of the regulating valve plug 124, to facilitate fluid communication between the inside and outside of the regulating valve plug 124. Due to the presence of the through-hole 1241, inner and outer surfaces of the regulating valve plug 124 are subjected to identical fluid pressures, so a driving force with which the first valve stem 125 drives the regulating valve plug 124 can be reduced. In the example of FIG. 2B, the first valve assembly may comprise a supporting valve seat 140. The supporting valve seat 140 is annular, fixed to the valve body 110, and is used for supporting the valve seat 121. The supporting valve seat 140 enables the valve seat 121 to be fixed to the valve body 110 with greater stability. A sealing ring may also be provided between the valve seat 121 and the valve body 110. A snap ring 127 may also be provided between the supporting valve seat 140 and the slider 123, for the purpose of providing further axial support for the slider 123 in the valve seat 121. In other embodiments, other structures or supporting valve seats 140 of other shapes could also be used to ensure the stability of the valve seat 121, or if the control valve is being used in a low-flow-rate environment, a supporting valve seat structure may be excluded from the design.

Figure 5:
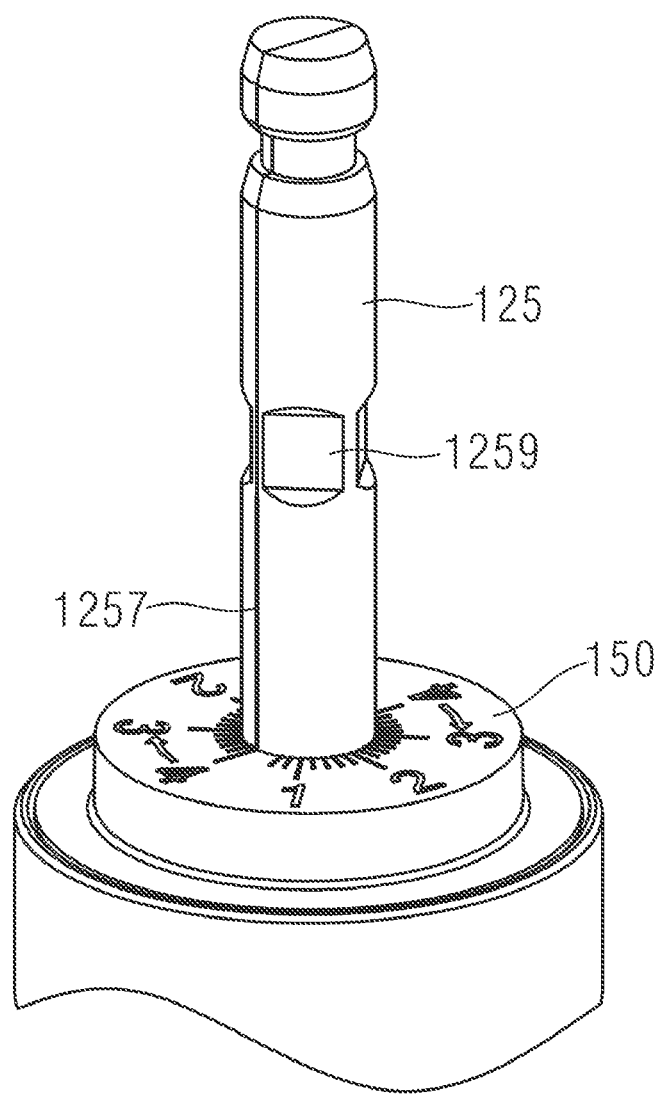
FIG. 5 is an enlarged drawing of a flow rate graduated disk in the embodiment shown in FIG. 1.

In the embodiment of FIG. 1, one end of the first valve stem 125 extends out of the valve body 110, and a flow rate graduated disk 150 is provided at an upper port of the valve body 110, to mark a preset flow rate. FIG. 5 provides an enlarged drawing of the flow rate graduated disk 150. As shown in FIG. 5, a flow rate graduated disk 150 may be provided around a part of the first valve stem 125 which extends out of the valve body 110. Correspondingly, a longitudinally extending marker line 1257 may be provided on the first valve stem 125. When the first valve stem 125 is rotated into place, a value on the flow rate graduated disk 150 corresponding to the marker line 1257 indicates a currently preset flow rate value.

In some embodiments, the flow rate graduated disk 150 is disposed in a fixed manner on a port of the valve body 110 but is not disposed on the first valve stem 125; thus, the flow rate graduated disk 150 will not be caused to move by movement of the first valve stem 125. In some embodiments, a flow rate graduated disk could also be disposed on the first valve stem 125, with a fixed marker line being provided on the valve body 110. In some embodiments, a seal (not shown) may also be provided between contact surfaces of the first valve stem 125 and the flow rate graduated disk 150. An indented part 1259 shown in FIG. 5 facilitates manual (e.g. using a wrench for turning) or automatic turning of the first valve stem 125. For example, the indented part 1259 may be connected to an actuator in a shape-fitting manner and driven by the actuator to perform rotational movement or linear movement.

In some embodiments, such as the embodiment shown in FIG. 2A, a sealing hoop 1214 may also be between the valve seat 121 and the valve body 110. In some embodiments, a sealing hoop 1216 may also be provided between the regulating valve plug 124 and the valve seat 121, to inhibit leakage. In some embodiments, the sealing hoop 1216 is provided around an upper part of an outer wall of the valve seat 121 and can be in contact with an inner wall of the regulating valve plug 124. In some embodiments, as shown in FIG. 2A, a sealing ring 1242 may also be on an end face of an opening end of the regulating valve plug 124; the sealing ring 1242 is used to block fluid communication between the inlet passage 111 and the interior of the valve seat 121.

In the embodiments shown in FIGS. 1, 2A and 2B, the first valve assembly 120 operates in the following way. That end of the first valve stem 125 which extends out of the valve body may be manually operated and may also be connected to an actuator (not shown in the figures) and driven by the actuator. Once the valve body 110 has been mounted to the fluid passage, the first valve stem 125 can be rotated to a preset scale mark. The rotation of the first valve stem 125 drives the slider 123 in the valve seat 121 to slide along an inner periphery of the valve seat, so that the slider 123 partially blocks the opening 1212 of the valve seat to an opening size corresponding to the preset scale mark, thereby realizing flow rate presetting.

When it is necessary to adjust a current flow rate, the actuator (not shown) connected to the first valve stem 125 can drive the first valve stem 125 to move up or down, thereby driving the regulating valve plug 124 to move axially in a corresponding manner, and thereby partially or completely blocking the opening 1212 in the axial direction. When the regulating valve plug 124 completely blocks the opening 1212, the sealing ring 1242 abuts an outer edge at the bottom of the valve seat 121 or abuts the supporting valve seat 140 and can thereby inhibit fluid in the inlet 111 from flowing into the regulating valve plug 124 or the valve seat 121. At the same time, the sealing hoop 1214 can inhibit fluid from flowing toward the second valve assembly 130 through a gap between the valve body 110 and the valve seat 121, and the sealing hoop 1216 can inhibit fluid from flowing toward the second valve assembly 130 through a gap between the regulating valve plug 124 and the valve seat 121. Through the restriction of flow rate by the regulating valve plug 124, the pressure of fluid entering the interior of the valve seat 121 is converted from the first fluid pressure P1 at the inlet to the second fluid pressure P2.

Here, the setting of flow rate is realized by rotational movement of the first valve stem 125, and the regulation of fluid flow rate is realized by axial movement of the first valve stem 125; hence, in the embodiments above, only the first valve stem 125 is needed in order to realize flow rate setting and flow rate regulation. At the same time, since there is fluid communication between the inside and outside of the regulating valve plug 124, the first valve stem 125 can accomplish the abovementioned functional demands using a small driving force, so resources are saved to the greatest extent possible, and the structure is optimized.

Second Valve Assembly—Pressure Difference Balancing Valve

Figure 3:
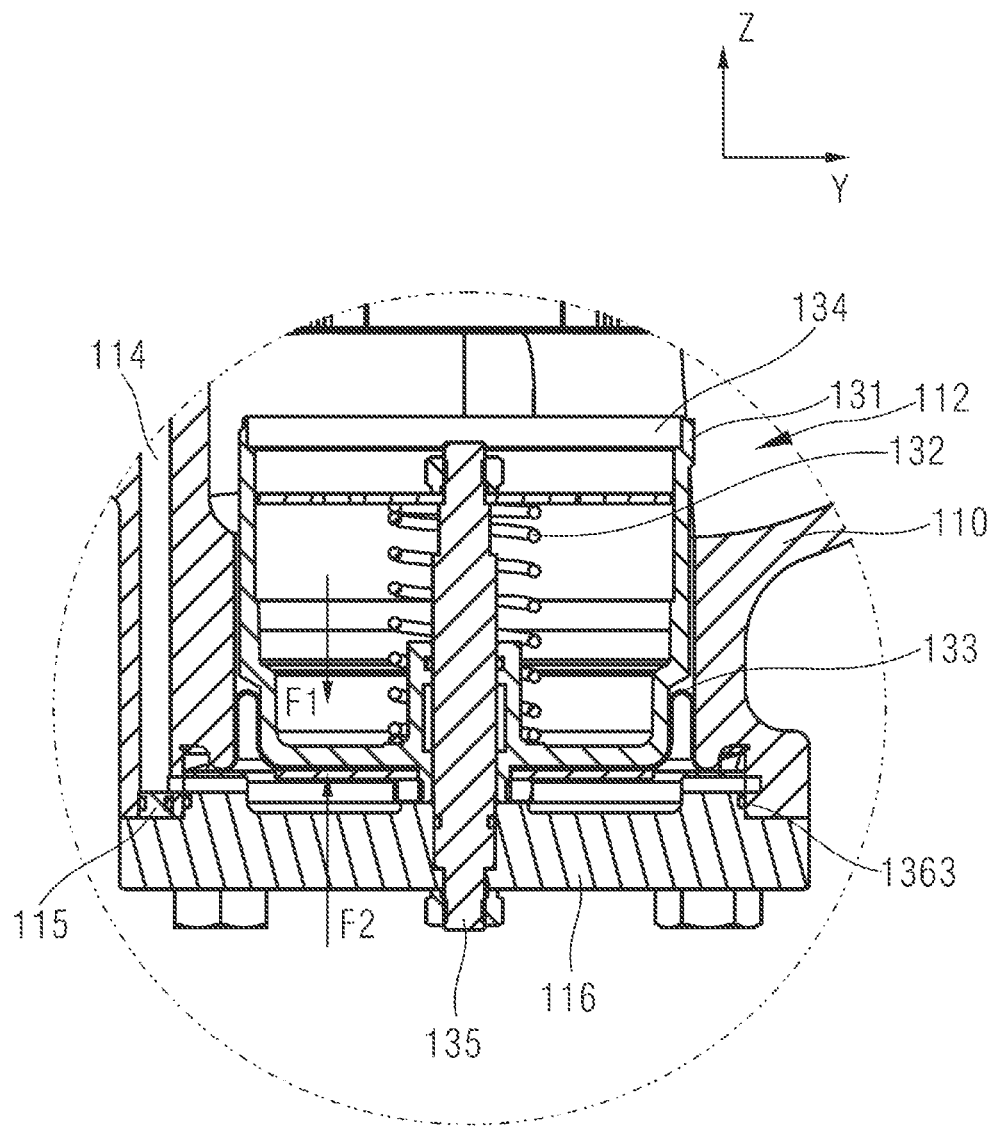
FIG. 3 is a view of a section in the Y direction of a second valve assembly 130 in the embodiment shown in FIG. 1.

FIG. 3 shows an enlarged drawing of a sectional front view of the second valve assembly 130 in FIG. 1. The second valve assembly 130 is a pressure difference balancing valve structure. In some embodiments, the second valve assembly 130 can regulate the flow rate according to the difference between the first fluid pressure P1 at the inlet passage 111 and the second fluid pressure P2 in the fluid passage 113, thereby controlling the flow rate through the control valve 100 and realizing pressure difference balancing. In some embodiments, as shown in FIG. 3, the second valve assembly 130 comprises a movable balancing valve plug 131, which is in the shape of a cylinder having an opening at one end (or is similar in shape to an inverted bell jar) and can be displaced in the axial direction Z thereof. In FIG. 3, the displacement of the balancing valve plug 131 along the Z axis can partially or completely block an opening in communication with the outlet passage 112. Thus, the displacement of the balancing valve plug 131 can change the flow rate of fluid flowing toward the outlet passage 112.

In FIG. 3, the balancing valve plug 131 has an upward-facing opening and is in the shape of an inverted bell jar. In some embodiments, in addition to a circular shape, a cross section of the movable balancing valve plug 131 could also be elliptical, square or another irregular shape, etc. An elastic member 132 is disposed inside the balancing valve plug 131; the elastic member 132 has one end fixed and another end abutting the bottom of an inner wall of the balancing valve plug 131. The interior of the balancing valve plug 131 is in fluid communication with the first valve assembly 120, so that a fluid pressure borne by the inner wall of the balancing valve plug 131 is the second fluid pressure P2, and equal to the fluid pressure at the outlet 501 of the first valve assembly 120.

As shown in FIG. 1, a pressure-leading tube 114 leads fluid from the inlet passage 111 to the bottom of an outer wall of the balancing valve plug 131, i.e. a bottom face of the balancing valve plug 131 is subjected to the same first fluid pressure P1 as the inlet passage 111. Thus, inside the balancing valve plug 131, an elastic force f applied by the elastic member 132 and a force applied by the second fluid pressure P2 (a downward resultant force F1 in the figure) act together on the inside bottom of the balancing valve plug 131. At the same time, outside the balancing valve plug 131, the first fluid pressure P1 identical to the pressure at the inlet passage 111 acts on the outside bottom of the balancing valve plug 131 (this force F2 is directed upward in the figure). Under the joint action of the inside and outside pressures, the balancing valve plug 131 can attain a balanced state, i.e. F1=F2.

If a change occurs in the first fluid pressure P1 and/or the second fluid pressure P2, the balancing valve plug 131 is displaced because the forces at the two sides are not balanced (F1≠F2), until the inside and outside pressures attain a balanced state (F1=F2) again. Thus, an adjustable outlet flow rate of the pressure difference balancing valve is independent of the fluid pressures at the inlet passage and the outlet passage and is only dependent on the pressure difference between P1 and P2, i.e. a restoring force of the elastic member. Here, a maximum elastic restoring force of the elastic member is a preset value, which determines a maximum value of the difference between the first fluid pressure P1 and the second fluid pressure P2. For control valves of different flow rate grades, the preset values of the maximum restoring force of the elastic member are different.

In the example shown in FIGS. 1 and 3, the balancing valve plug 131 is movably disposed downstream of the first valve assembly 120. The balancing valve plug 131 may be inserted into the valve body from the bottom of the valve body 100 and arranged to surround a second valve stem 135. The second valve stem 135 is fixed to a base 116; the base 116 is in turn tightened on the valve body 110 by means of bolts. The balancing valve plug 131 can be displaced in the axial direction of the second valve stem 135 (the Z direction).

In some embodiments, a sealing ring 1363 may be between the base 116 and the valve body 110, to inhibit leakage. Here, one elastic member 132 is disposed inside the balancing valve plug 131 and arranged to surround the second valve stem 135. The elastic member 132 has one end abutting the bottom (inner wall) of the balancing valve plug 131, and another end fixed to the second valve stem 135. The extension/retraction of the elastic member 132 may be used to balance the difference between the fluid pressures P1 and P2. Here, the elastic member 132 preferably may be a spring, e.g. a coil spring. In other embodiments, the elastic member 132 may also be selected from other flexible elements capable of storing energy.

Here, the second valve stem 135 has a guiding action, and can cause the balancing valve plug 131 and the elastic member 132 to move in the direction in which the second valve stem 135 lies, in order to avoid tilting, such that guiding and limiting functions are more reliable. In some embodiments, in order to simplify the structure, the second valve stem 135 need not be installed, or the direction of movement of the balancing valve plug 131 and the elastic member 132 may be defined in another manner.

In the example in FIGS. 1 and 3, the bottom face (outer wall) of the balancing valve plug 131 abuts a rolling diaphragm 133 made of a flexible material. Edges of the rolling diaphragm 133 are in sealed connection with the valve body 110/second valve stem 135. In actual applications, the rolling diaphragm 133 may be made of any suitable flexible material. The rolling diaphragm 133 may be made with O-shaped annular edges at the top and bottom, or with fixing holes at the periphery of the bottom, or in another form. In a specific embodiment, the rolling diaphragm 133 may be made of a rubber material such as nitrile butadiene rubber or epichlorohydrin rubber, and/or a polyester film and/or a metal foil, or another material. As shown in FIG. 3, a region below the rolling diaphragm 133 is in fluid communication with the first pressure-leading tube 114 and is at a fluid pressure equal to P1.

In other words, the rolling diaphragm 133 transmits the first fluid pressure P1 borne thereby to the bottom face of the balancing valve plug 131. A region above the rolling diaphragm 133 is in communication with the outlet of the first valve assembly 120 and is at a fluid pressure equal to P2. Thus, the rolling diaphragm 133 can isolate the region at the first fluid pressure P1 from the region at the second fluid pressure P2. In actual applications, when the first fluid pressure P1 increases, the balanced state that was originally attained is broken; the rolling diaphragm 133 pushes the balancing valve plug 131 to move upward, compressing the elastic member 132, until the balancing valve plug 131 attains a balanced state again, i.e. the resultant force of the elastic force f and the force applied by the second fluid pressure P2 to the bottom (inner wall) of the balancing valve plug 131 is substantially equal to the force applied by the first fluid pressure P1 to the bottom face (outer wall) of the balancing valve plug 131 via the rolling diaphragm. Thus, the balancing valve plug 131 can adjust a flow rate of a flow passage according to the difference between the first and second fluid pressures.

In some embodiments, an opening side (upper end) of the balancing valve plug 131 may also comprise a valve cover 134. In some embodiments, the valve cover 134 is likewise arranged to surround the second valve stem 135. A through-hole 1342 is provided in the valve cover 134; in some embodiments, multiple through-holes are arranged uniformly in the valve cover, to enable fluid to flow into the interior of the balancing valve plug 131. The function of the valve cover 134 is to reduce turbulence and noise inside the balancing valve plug 131.

In FIG. 3, the first pressure-leading tube 114 is provided on the valve body 110. In some embodiments, the pressure-leading tube 114 may be designed such that an inlet is larger than an outlet, i.e. a diameter of a part close to the inlet passage 111 is greater than a diameter of a part close to the rolling diaphragm 133. For example, the first pressure-leading tube 114 may also be stepped, i.e. the first pressure-leading tube 114 may be divided into two sections, with a first section being close to the inlet passage 111, a second section being close to the rolling diaphragm 133, and a diameter of the first section being greater than a diameter of the second section.

In some embodiments, the first pressure-leading tube 114 may also comprise three or more sections or be designed as a duct having a gradually changing diameter. In addition, a plug piece 115 may be provided at the part of the first pressure-leading tube 114 close to the rolling diaphragm 133; the plug piece 115 is fixed between the first pressure-leading tube 114 and the base 116, and helps the first pressure-leading tube 114 to lead fluid flow from the inlet directly into a sealed region of the rolling diaphragm 133, to inhibit fluid from flowing out of the control valve. Compared with using a passage in the first valve stem directly as a pressure-leading tube or providing a pressure-leading tube in another way, the first pressure-leading tube 114 shown in FIG. 3 has a more reliable structure, and does not become blocked easily, so is easy to maintain.

Figure 4A:
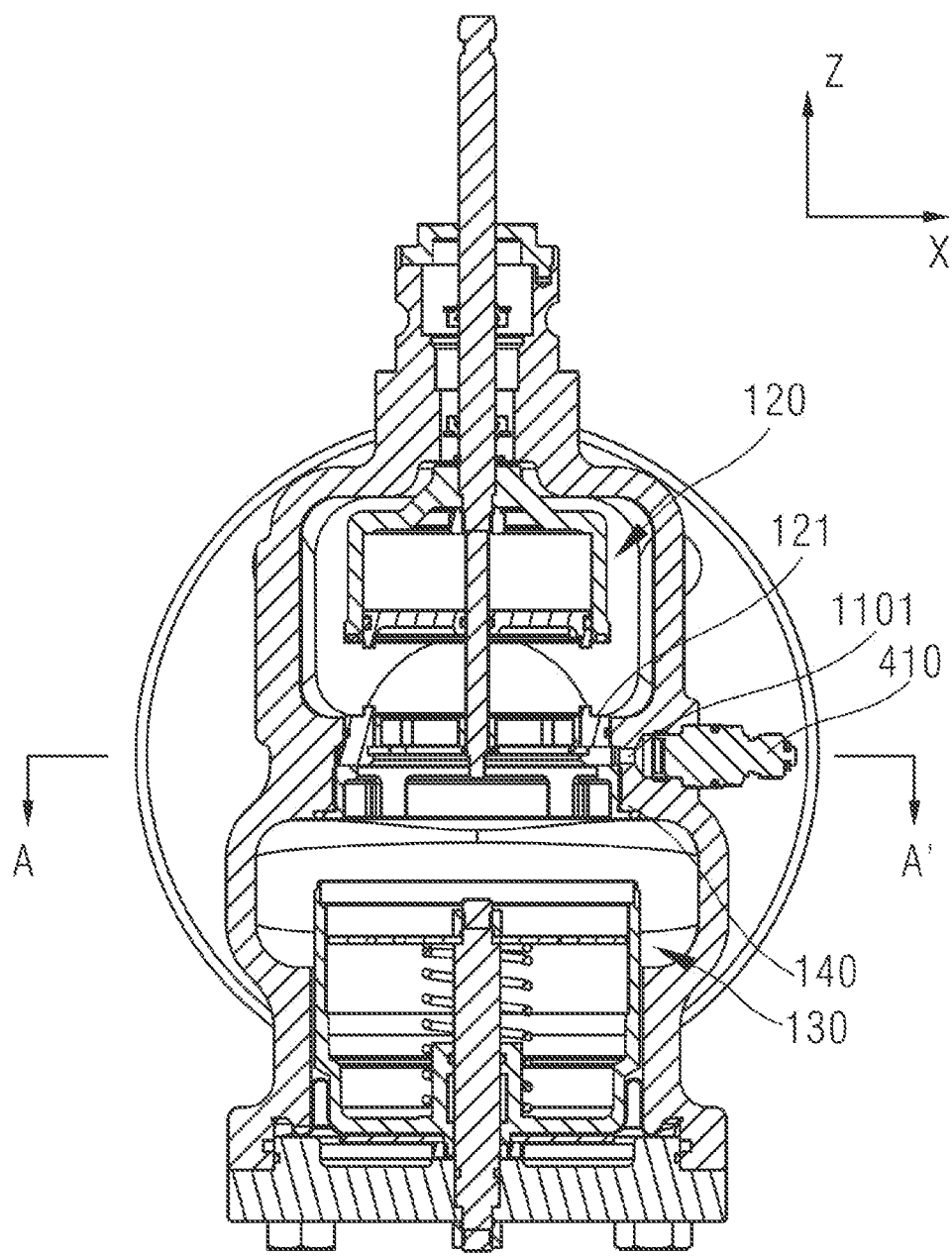
FIG. 4A is a view of a section in the X direction of the control valve in the embodiment shown in FIG. 1.
Figure 4B:
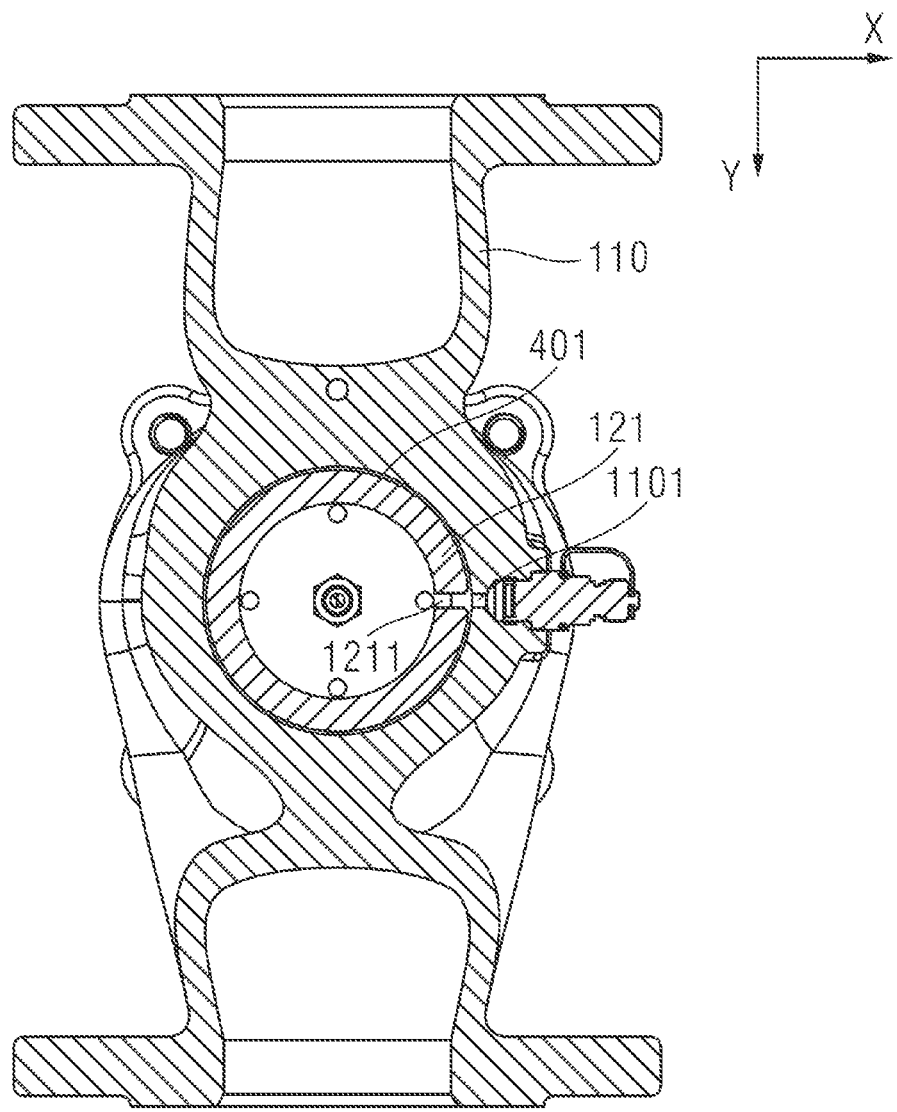
FIG. 4B is a view of a transverse section of the control valve in the embodiment shown in FIG. 1.

FIGS. 4A and 4B show a control valve having a P2 pressure test port incorporating teachings of the present disclosure. As shown in FIGS. 4A and 4B, a pressure-leading assembly for measuring the second fluid pressure P2 inside the valve body 110 is also provided in the first valve assembly 120; the pressure-leading assembly specifically comprises a pressure-leading groove 401, a pressure-leading hole 1211 and a second pressure-leading tube 1101, wherein the second pressure-leading tube 1101 may be plugged tightly by a piston 410. FIG. 4B is a schematic diagram of a cross section taken along the cutting line A-A' in FIG. 4A.

As shown in FIG. 4B, the pressure-leading groove 401 is disposed between the valve seat 121 and the valve body 110 and surrounds the valve seat 121. The pressure-leading hole 1211 is disposed in the valve seat 121, such that the interior of the valve seat 121 is in fluid communication with the pressure-leading groove 401. The position of the pressure-leading hole 1211 may also be seen by looking at the valve seat 121 in FIG. 2B; the pressure-leading hole is located at the bottom of the valve seat 121. The second pressure-leading tube 1101 is disposed on the valve body 110, such that the pressure-leading groove 401 is in fluid communication with the outside of the valve body 110. The pressure-leading groove 401, the pressure-leading hole 1211 and the second pressure-leading tube 1101 are used for measuring the second fluid pressure P2 inside the valve seat 121. In actual applications, a multi-point pressure-taking method may also be used to monitor the second fluid pressure P2 inside the valve body 110, or another method may be used to take pressure.

In the PICV in the embodiments above, the first valve assembly 120 and the second valve assembly 130 are arranged to be separate in space. The first valve assembly 120 shown in FIGS. 2A and 2B may also be applied in other control valves requiring flow rate presetting and flow rate regulating functions and is not restricted to being used in a PICV. In other words, the first valve assembly 120 may also be applied in an ordinary electric regulating valve.

The embodiments above are merely example embodiments of the present disclosure, which are not intended to limit it. Any amendments, equivalent substitutions, or improvements etc. made within the scope of the present disclosure shall be included in the scope of protection thereof.

Key to the drawings:

100: control valve;
110: valve body;
111: inlet passage;
112: outlet passage;
114: first pressure-leading tube;
115: plug piece;
116: valve base;
118: communication port;
120: first valve assembly;
121: valve seat;
1211: pressure-leading hole;
1212: opening;
1214: sealing hoop
123: slider;

-continued

Key to the drawings:

1231: blocking part;
1235: connecting part;
124: regulating valve plug;
1241: through-hole;
1242: sealing ring
125: first valve stem;
1251: valve stem lower part;
1253: nut;
1254: threaded part;
1255: flange;
1257: marker line;
1259: operating part;
127: snap ring;
140: supporting valve seat
130: second valve assembly;
131: balancing valve plug;
132: elastic member;
133: rolling diaphragm;
134: valve cover;
135: second valve stem;
1342: through-hole
150: graduated disk;
401: pressure-leading groove;
501: valve seat opening;
1101: pressure-leading hole

The invention claimed is:

1. A control valve for controlling a flow rate of a fluid in a fluid passage, the control valve comprising:
a valve body defining an internal cavity having an inlet passage and an outlet passage;
a first valve assembly disposed between the inlet passage and the outlet passage;
wherein the first valve assembly comprises:
a valve seat in the shape of a cylinder having an opening at one end, the valve seat fixed relative to the valve body, with a circumferentially extending opening in a sidewall of the valve seat;
a slider disposed inside the valve seat and movable in a circumferential direction of an inner wall of the valve seat to partially or completely block the opening in the sidewall in the circumferential direction, but stationary relative to the valve seat in an axial direction;
a regulating valve plug in the shape of a cylinder having an opening at one end, arranged to surround the valve seat and movable in the axial direction to partially or completely block the opening in the sidewall of the valve seat in the axial direction; and
a first valve stem connected to the slider and to the regulating valve plug, the first valve stem having one end extending out of the valve body;
wherein a first overlap between the slider and the opening in the circumferential direction and a second overlap of the regulating valve plug and the opening in the axial direction are changed by movement of the first valve stem:
a second valve assembly disposed between the inlet passage and the outlet passage, and separated from the first valve assembly;
the second valve assembly comprising a pressure difference balancing valve operable to regulate a flow rate according to the difference between a first fluid pressure at the inlet passage and a second fluid pressure between the first valve assembly and the second valve assembly.

2. The control valve as claimed in claim 1, wherein:
the first valve stem moves through the regulating valve plug and is connected in a fixed manner to the regulating valve plug in the axial direction; and
the first valve stem moves through the valve seat and a second end of the first valve stem is connected in a shape-fitting manner to the slider in the circumferential direction.

3. The control valve as claimed in claim 1, wherein the second valve assembly is located downstream of the first valve assembly.

4. The control valve as claimed in claim 3, wherein the second valve assembly comprises a movable balancing valve plug in the shape of a cylinder having an opening at one end, and moveable in an axial direction to change a flow rate of flow to the outlet passage;
wherein a first side of the balancing valve plug is subjected to an applied force by the first fluid pressure, a second side is subjected to a resultant force by an elastic member and the second fluid pressure and the balancing valve plug attains a balanced state under the joint action of the forces at the first side and the second side.

5. The control valve as claimed in claim 4, wherein the second valve assembly further comprises:
a rolling diaphragm in sealed connection with the valve body, a first side of the rolling diaphragm subjected to the first fluid pressure, and a second side abutting an outer wall of the balancing valve plug;
the elastic member disposed inside the balancing valve plug capable of extending and retracting in the axial direction of the balancing valve plug having one end fixed and another end abutting an inner wall of the balancing valve plug.

6. The control valve as claimed in claim 5, further comprising a first pressure-leading tube providing communication between the inlet passage and the first side of the rolling diaphragm.

7. The control valve as claimed in claim 4, wherein the second valve assembly further comprises:
a valve cover covering an opening of the balancing valve plug with a through-hole to establish fluid communication between an inside and an outside of the balancing valve plug.

8. The control valve as claimed in claim 4, wherein the second valve assembly further comprises:
a second valve stem having one end fixed to the valve body and a second end inserted into the balancing valve plug;
the elastic member arranged to surround the second valve stem and the one end of the elastic member abuts the second end of the second valve stem.

9. The control valve as claimed in claim 1, wherein the first valve assembly further comprises:
a pressure-leading groove disposed between the valve seat and the valve body and surrounding the valve seat;
a pressure-leading hole in the valve seat providing a region having the second fluid pressure inside the valve seat in fluid communication with the pressure-leading groove;
a pressure-leading tube disposed on the valve body in fluid communication with an outside of the valve body.

10. The control valve as claimed in claim 9, further comprising an annular supporting valve seat fixed to the valve body for supporting the valve seat; and
the pressure-leading groove disposed in an annular space enclosed by the supporting valve seat, the valve seat, and the valve body.

11. The control valve as claimed in claim 1, further comprising a sealing hoop around an outer wall of the valve seat in contact with the valve body, or around an outer wall of the valve seat in contact with the regulating valve plug, or at an opening end of the regulating valve plug.

12. The control valve as claimed in claim 1, further comprising a through-hole in an end face of the regulating valve plug to establish fluid communication between an inside and an outside of the regulating valve plug.

13. The control valve as claimed in claim 1, further comprising a flow rate graduated disk around the first valve stem at a first end of the valve body;
wherein the first valve stem extends out, with a longitudinally extending marker line on the first valve stem; and
wherein, when the first valve stem is rotated into place, a value displayed on the flow rate graduated disk corresponding to the marker line indicates a currently preset flow rate value.

14. The control valve as claimed in claim 1, wherein the opening in the valve seat extends circumferentially between 170 degrees and 190 degrees.

15. A control valve for controlling a flow rate of a fluid in a fluid passage, the control valve comprising:
a valve body defining an internal cavity having an inlet passage and an outlet passage;
a first valve assembly disposed between the inlet passage and the outlet passage;
wherein the first valve assembly comprises:
a valve seat in the shape of a cylinder having an opening at one end, the valve seat fixed relative to the valve body, with a circumferentially extending opening in a sidewall of the valve seat;
a slider disposed inside the valve seat and movable in a circumferential direction of an inner wall of the valve seat to partially or completely block the opening in the sidewall in the circumferential direction, but stationary relative to the valve seat in an axial direction;
a regulating valve plug in the shape of a cylinder having an opening at one end, arranged to surround the valve seat and movable in the axial direction to partially or completely block the opening in the sidewall of the valve seat in the axial direction; and
a first valve stem connected to the slider and to the regulating valve plug, the first valve stem having one end extending out of the valve body;
wherein a first overlap between the slider and the opening in the circumferential direction and a second overlap of the regulating valve plug and the opening in the axial direction are changed by movement of the first valve stem;
a second valve assembly located downstream of the first valve assembly;
the second valve assembly comprising a pressure difference balancing valve operable to regulate a flow rate according to the difference between a first fluid pressure at the inlet passage and a second fluid pressure between the first valve assembly and the second valve assembly.

16. A control valve for controlling a flow rate of a fluid in a fluid passage, the control valve comprising:
a valve body defining an internal cavity having an inlet passage and an outlet passage;
a first valve assembly disposed between the inlet passage and the outlet passage;
wherein the first valve assembly comprises:
a valve seat in the shape of a cylinder having an opening at one end, the valve seat fixed relative to the valve body, with a circumferentially extending opening in a sidewall of the valve seat;
a slider disposed inside the valve seat and movable in a circumferential direction of an inner wall of the valve seat to partially or completely block the opening in the sidewall in the circumferential direction, but stationary relative to the valve seat in an axial direction;
a regulating valve plug in the shape of a cylinder having an opening at one end, arranged to surround the valve seat and movable in the axial direction to partially or completely block the opening in the sidewall of the valve seat in the axial direction; and
a first valve stem connected to the slider and to the regulating valve plug, the first valve stem having one end extending out of the valve body;
wherein a first overlap between the slider and the opening in the circumferential direction and a second overlap of the regulating valve plug and the opening in the axial direction are changed by movement of the first valve stem;
a second valve assembly disposed between the inlet passage and the outlet passage, and downstream of the first valve assembly;
the second valve assembly comprising a movable balancing valve plug in the shape of a cylinder having an opening at one end, and moveable in an axial direction to change a flow rate of flow to the outlet passage;
wherein a first side of the balancing valve plug is subjected to an applied force by a first fluid pressure at the inlet passage, a second side is subjected to a resultant force by an elastic member and a second fluid pressure between the first valve assembly and the second valve assembly, and the balancing valve plug attains a balanced state under the joint action of the forces at the first side and the second side.

* * * * *